(12) United States Patent
Rametsteiner et al.

(10) Patent No.: US 11,254,063 B2
(45) Date of Patent: Feb. 22, 2022

(54) INDUCTIVE WELDING OF PLASTIC OBJECTS WITH ELECTRICALLY INTERRUPTED HEATING MEANS

(71) Applicant: BRUGG Rohrsystem AG, Kleindöttingen (CH)

(72) Inventors: Karl Rametsteiner, Linz (AT); Urs Hunziker, Meilen (CH)

(73) Assignee: Brugg Rohrsystem AG, Kleindöttingen (CH)

( * ) Notice: Subject to any disclaimer, the term of this patent is extended or adjusted under 35 U.S.C. 154(b) by 367 days.

(21) Appl. No.: 16/343,444

(22) PCT Filed: Oct. 20, 2017

(86) PCT No.: PCT/EP2017/076888
§ 371 (c)(1),
(2) Date: Apr. 19, 2019

(87) PCT Pub. No.: WO2018/073430
PCT Pub. Date: Apr. 26, 2018

(65) Prior Publication Data
US 2019/0270257 A1    Sep. 5, 2019

(30) Foreign Application Priority Data
Oct. 20, 2016 (DE) .................. 10 2016 120 037.9

(51) Int. Cl.
*B29C 65/36* (2006.01)
*B29C 65/48* (2006.01)
(Continued)

(52) U.S. Cl.
CPC ........ *B29C 65/3644* (2013.01); *B29C 65/364* (2013.01); *B29C 65/3612* (2013.01);
(Continued)

(58) Field of Classification Search
CPC ............ B29C 65/3644; B29C 65/3612; B29C 65/4815; B29D 23/003
See application file for complete search history.

(56) References Cited

U.S. PATENT DOCUMENTS 2,739,829 A    3/1956 Pedlow et al.
5,125,690 A  *  6/1992 Taylor ................. B29C 65/18
                                                           156/308.2
(Continued)

FOREIGN PATENT DOCUMENTS

AT    508119 A4   11/2010
DE    802282 C    2/1951
(Continued)

OTHER PUBLICATIONS

Office Action in Korean Patent Application No. 10-2019-7011357; pp. 1-10; dated Mar. 4, 2021; Korean Intellectual Property Office, Government Complex Daejeon Building 4, 189, Cheongsa-ro, Seo-gu, Daejeon, 35208, Republic of Korea.

*Primary Examiner* — Daniel McNally
(74) *Attorney, Agent, or Firm* — Robert A. Blaha; Smith Tempel Blaha LLC

(57) ABSTRACT

Described is a heating means for thermally connecting two objects each having a plastic material, wherein, during the connecting, a first inner object is surrounded at least partially by a second outer object, and the heating means surrounds the first inner object at least partially along a complete circumferential course around the first inner object, and is located between the first inner object and the second outer object. The heating means has a ribbon-type structure. The ribbon-type structure has an auxiliary heating material, which is inductively heatable, wherein the auxiliary heating material is spatially distributed or arranged along the circumferential course such that an electrical conductivity is interrupted at at least one position along the complete circumferential course around the first inner object. Further described are an arrangement and a system each having such a heating means as well as a method for thermally connecting two plastic objects.

19 Claims, 4 Drawing Sheets

(51) Int. Cl.
  *B29D 23/00* (2006.01)
  *B29C 65/00* (2006.01)
  *B29C 65/50* (2006.01)
  *F16L 47/03* (2006.01)
  *B29L 23/00* (2006.01)

(52) U.S. Cl.
  CPC ...... *B29C 65/3648* (2013.01); *B29C 65/3668* (2013.01); *B29C 65/3676* (2013.01); *B29C 65/4815* (2013.01); *B29C 65/5021* (2013.01); *B29C 65/5057* (2013.01); *B29C 66/1122* (2013.01); *B29C 66/3034* (2013.01); *B29C 66/5221* (2013.01); *B29C 66/5229* (2013.01); *B29C 66/532* (2013.01); *B29C 66/53241* (2013.01); *B29C 66/73921* (2013.01); *B29D 23/003* (2013.01); *F16L 47/03* (2013.01); *B29C 66/71* (2013.01); *B29C 66/727* (2013.01); *B29C 66/72321* (2013.01); *B29C 66/7311* (2013.01); *B29L 2023/225* (2013.01)

(56) References Cited

U.S. PATENT DOCUMENTS

| | | | | |
|---|---|---|---|---|
| 5,352,871 A | * | 10/1994 | Ross | B29C 65/3668 219/633 |
| 5,462,314 A | * | 10/1995 | Goto | B29C 65/3612 285/21.2 |
| 5,504,308 A | | 4/1996 | Shiozaki | |
| 5,756,973 A | | 5/1998 | Kirkwood et al. | |
| 6,278,096 B1 | * | 8/2001 | Bass | B29C 45/14336 219/629 |
| 2015/0020977 A1 | * | 1/2015 | King | B29C 66/1122 156/379.7 |

FOREIGN PATENT DOCUMENTS

| | | |
|---|---|---|
| DE | 3731762 A1 | 3/1989 |
| DE | 102006059337 A1 | 6/2008 |
| DE | 102013021667 A1 | 6/2015 |
| EP | 0265666 B1 | 2/1993 |
| EP | 2452805 A1 | 5/2012 |
| EP | 2452805 B1 | 6/2015 |
| EP | 2886285 A1 | 6/2015 |
| FR | 2748415 A1 | 11/1997 |
| JP | S63308080 A | 12/1988 |
| JP | H09188859 A | 7/1997 |
| JP | 09323359 A * | 12/1997 ............. B29C 66/71 |
| JP | H09323359 A | 12/1997 |
| JP | H10688 A | 1/1998 |
| JP | 10047580 A * | 2/1998 ....... B29C 66/12469 |
| JP | H1047580 A | 2/1998 |
| JP | H11304080 A | 11/1999 |
| KR | 100260467 B1 | 7/2000 |
| WO | WO 2005019718 A1 | 3/2005 |
| WO | WO 2007128384 A2 | 11/2007 |
| WO | WO 2012137197 A2 | 10/2012 |
| WO | WO 2013106877 A1 | 7/2013 |

* cited by examiner

Fig. 10
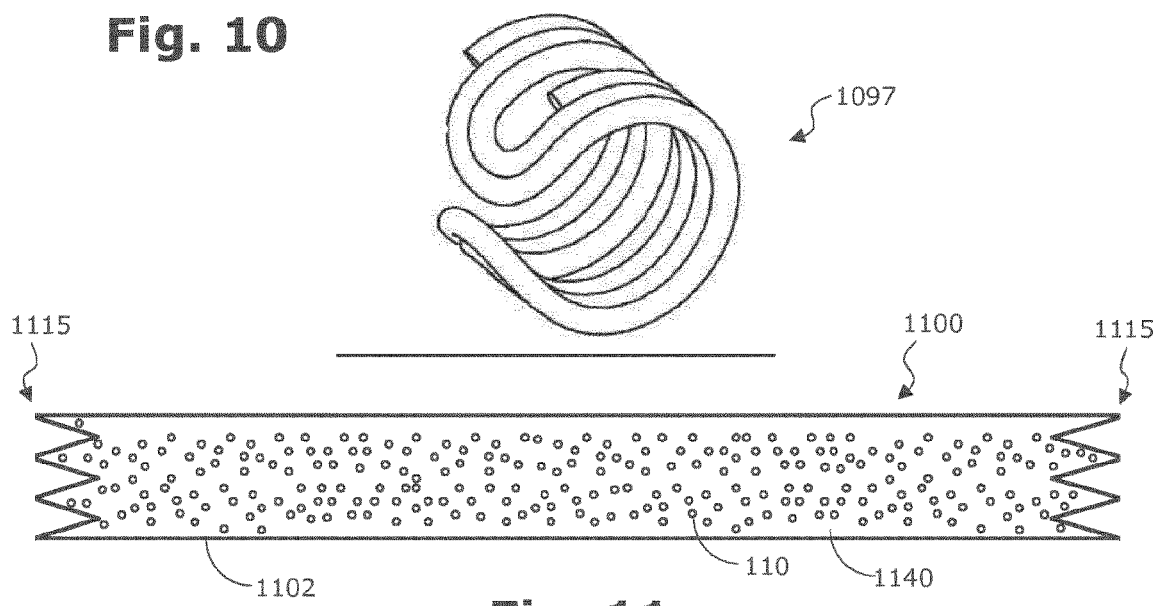
Fig. 11
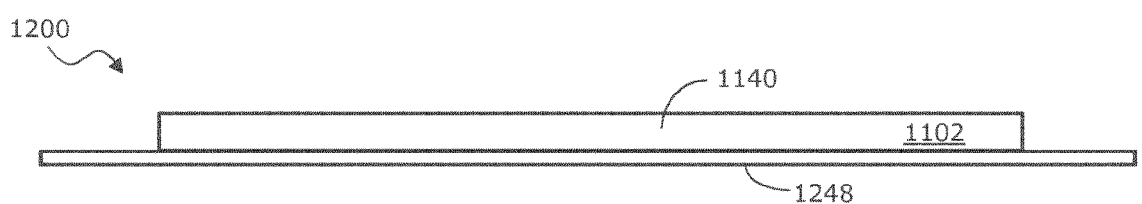
Fig. 12
Fig. 13
Fig. 14
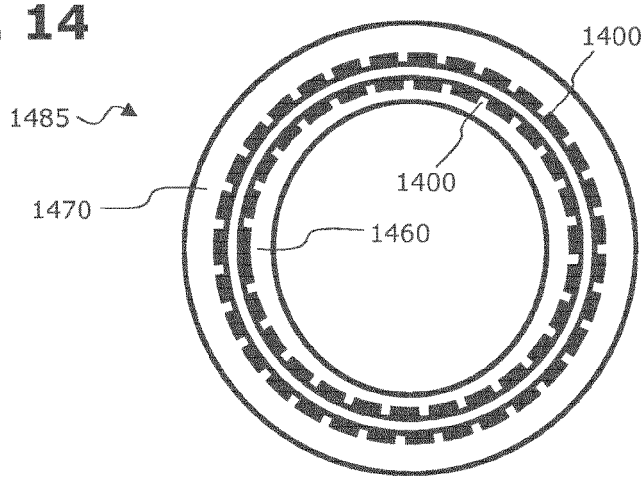

INDUCTIVE WELDING OF PLASTIC OBJECTS WITH ELECTRICALLY INTERRUPTED HEATING MEANS

CROSS-REFERENCE TO RELATED APPLICATIONS

The present application is a national phase application derived from international patent application no. PCT/EP2017/076888, filed on Oct. 20, 2017, which benefits form the filing date of German patent application no. DE 10 2016 120 037.9, filed Oct. 20, 2016, both applications of which are incorporated herein by reference in their respective entirety.

TECHNICAL FIELD

The present invention relates to the technical area of the thermally connecting two objects made of plastic by induction welding. The present invention relates in particular to a heating means made of an electrically conducting and inductively heatable material, a welded arrangement as well as a welding system having such a heating means as well as a method for thermally connecting two objects each having a plastic material.

TECHNOLOGICAL BACKGROUND

Objects made of plastic may be thermally connected to each other by inserting an electrically conductive material between the two objects to be connected and by heating the former by an alternating electromagnetic field, which is generated by a specially embodied generator. In the so-called induction welding of plastic objects, an electromagnetic coupling is effected between a magnetic and electrically conductive material and an induction generator substantially via a magnetic field, which is variable in time and which is generated by a coil of the induction generator.

The principle of induction welding is used in particular in the thermal connecting of ends of two plastic pipes by a plastic bushing (or sleeve), which is pushed (or slipped) over the two ends to be welded together. Herein, a magnetic and electrically conductive heating means is introduced between the plastic bushing and the lateral surface of each respective end section of the two pipes to be connected and is heated inductively such that the outer sides of the two end sections as well as the inner side of the plastic bushing are molten on and assume a permanent welding connection during a subsequent cooling down.

Methods of induction welding for plastic casing pipes are disclosed for example in EP 2 886 285 A1 as well as in DE 10 2013 021 667 A1.

However, a technical problem in induction welding consists in that the amount of heat and/or the thermal energy, which is supplied via the heating means, is to be adjusted such that a stable thermal welded connection is ensured on the one hand and the form stability of the objects to be welded together is not endangered on the other hand. Only in this way, "good" welded connections can be achieved by induction welding.

However, for a "good" welded connection, it is not only necessary to exactly determine the total amount of thermal energy, which is used for a plane welded connection. Rather, it should also be catered for that this thermal energy is distributed as homogeneously as possible over the total surface of the welded connection. In particular, so-called local "hotspots" should be avoided, which may lead to a local overheating and damage in particular of liquefied plastic material.

For example, in the welding of insulated long-distance heat pipelines, it has turned out that punctual overheatings in the welding process of a casing pipe of an insulated long-distance heat pipeline change insulating materials (e.g. PU foams), which are arranged thereunder, such that the according insulating values change and/or diffusion barriers become permeable. Furthermore, overheatings and in particular local overheatings in crystalline raw materials or partially crystalline raw materials (e.g. in high density polyethylene, HDPE, which is a preferred raw material for plastic pipes) may result in pronounced irregularities in the formation of crystallites at least in a subsequent cooling-down process. Typically, mechanical disturbance zones are formed thereby, which represent mechanical predetermined breaking points as a consequence. In addition, strong undesired local overheatings may result in a rupture and/or a break of polymer chains, which is also referred to as so-called de-polymerization. Also, de-polymerizations represent mechanical weak points in the microstructure of the corresponding plastic material. In addition, an even stronger local heating may even result in a decomposition and thus in a highly undesired formation of gas bubbles (or gas pockets). Also, in this relation, it is obvious that the mechanical stability of a welded connection suffers thereby.

SUMMARY

There may be a need to improve the induction welding of plastic materials in respect of mechanically stable welded connections.

This object is solved by the subjects of the independent patent claims. Preferred embodiments of the present invention are described in the dependent patent claims.

According to a first exemplary embodiment of the invention, there is described a heating means for thermally connecting two objects each having a plastic material, wherein, during the connecting, (i) a first inner object is surrounded at least partially by a second outer object, and (ii) the heating means surrounds the first inner object at least partially along a complete circumferential course around the first inner object, and is located between the first inner object and the second outer object. The described heating means has a ribbon-type (or belt-type) structure having an auxiliary heating material, which is inductively heatable, wherein the auxiliary heating material is spatially distributed or arranged along the circumferential course such that an electrical conductivity is interrupted at at least one position along the complete circumferential course around the first inner object.

At the bottom of the described heating means is the finding (or insight) that by a selective (or targeted) interruption of the current flow along the circumferential direction it can be prevented in a simple manner that a short-circuit winding around the first inner object results, which [short-circuit current] would result in an induced current flow around the whole first inner object during an induction welding process. In a closed and/or uninterrupted conductive heating means, such an induced current flow results from the principle of a transformer, wherein one coil of the induction generator may represent the primary coil of the transformer, and the uninterruptedly conductive heating means may represent the secondary coil of the transformer.

In this relation, the inventors have recognized that a directed current, which occurs only for a heating means that is uninterruptedly conductive and surrounds the first inner object completely, may result in an asymmetry of the total current flow, which in turn may result in a non-uniform heating of the heating means. In the case of a closed conductive heating ribbon, an asymmetry (of the direction) of the current flow, which may be responsible for the heating in the heating means, may result from the fact that basically two types of currents develop upon an inductive excitation of the heating ribbon. A first type may be the current, which may flow around the whole first inner object due to the property of the heating means as a secondary transformer winding, and which is referred to in this document also as a short-circuit current. The short-circuit current may flow exclusively, or at least strongly preferred, in the circumferential direction. The second type of current may be so-called eddy currents, which may be generated during induction welding in the heating means as an electrical conductor in a known manner due to the exciting magnetic field, which may change in time, and which may in turn be generated by the coil of the induction generator. The eddy currents may generally have no particular predominant direction, and thus may result in a particular homogeneous inductive heat development. By the preventing of short-circuit currents precisely that part of the current may be interrupted, which may be responsible for the heating, and which may be asymmetrical in relation to the current direction. Thus, the homogeneity of the heating may overall be improved, and local overheatings in the plastic material to be liquefied may be avoided in a simple and effective manner during a welding process.

The circumferential direction, which may be defined by the circumferential course at each point of the heating means, is referred to in this document also as the tangential direction. A direction perpendicular to the circumferential direction and/or to the plurality of tangential directions is referred to in this document as a longitudinal direction or as an axial direction.

OVERVIEW OF EMBODIMENTS

Stated demonstratively, by at least one electrical interruption of the heating means it may be ensured that the heating means itself may not form a complete secondary winding around the first inner object. Thereby, short-circuit currents may be prevented, and the heating and/or warming of the heating means may be effected exclusively on the basis of eddy currents that may be generated inductively. In this way, local overheatings in individual hotspots may be avoided during a welding process. In addition, the mounting of the heating means and/or the laying alongside (or mounting) of the heating means around the first inner object may be simplified and the whole handling of an inductive welding process is simplified.

According to an embodiment example, the heating means may be formed such that it results in a warming of the adjoining plastic material at both sides of the ribbon-type structure. This may mean that during a thermal connecting, not only one object may be welded to another object, but that both objects may be welded to each other at least approximately symmetrically.

It is pointed out that also in cases where during most of the embodiment examples of inductive welding processes, cylindrical objects may be welded together, which may be arranged concentrically relative to each other, the heating means according to the invention may also be used for angled or oval objects. Hence, the circumferential line, along which the heating means extends, may not at all be circular.

According to an embodiment example, the auxiliary heating material may have an electrically conductive material. This may have the advantage, that so-called eddy currents may contribute to the inductive heating.

In this relation it is pointed out that the heating described in the present document may be effected in part by magnetic losses and in part by electrical losses. "Magnetic losses" are understood to be so-called cyclic magnetization losses (or losses due to reversal of magnetism) in the heating means, which may be related to the ferromagnetic and/or ferrimagnetic magnetizability of the heating means, and which may also be referred to as hysteresis losses. The "electrical losses" may in particular be ohmic losses in connection with the so-called eddy currents, which may be generated during the inductive interaction of the heating means with an electromagnetic field that may be generated by a corresponding generator.

In the following, further advantages of an inductive heating of the heating means based on eddy currents are described:

Eddy currents may preferably be generated with higher excitation frequencies than short-circuit currents. Herein, the excitation frequencies may be the frequencies of electromagnetic waves generated by a coil of an induction generator, which waves may be responsible for the inductive heating. Higher excitation frequencies may result however in a higher energy efficiency for the welding process. In addition, a plurality of different geometries and sizes of excitation coils may be used for higher excitation frequencies, such that specific suitable excitation coils may come in operation for different application cases.

In an at least electrically interrupted heating means, it may not be necessary to close the excitation coil of the induction generator completely around the first inner object, because no short-circuit current may be to be induced. Also this may contribute to that an induction welding with a plurality of different shapes and/or sizes of excitation coils can be realized. Thereby, plug connections, which may be prone to contamination and/or wear, can be avoided or their number can be reduced at least strongly.

By the described intentional abandonment of a tangentially flowing short-circuit current, the excitation coil may be enclosed hermetically in a suitable packaging. Thereby, the susceptibility of the excitation coil with respect to pollution and/or mechanical loads, which may occur in practice, may be reduced.

According to an embodiment example, the electrically conductive material may have a metal or plural metals and/or a metal alloy or plural metal alloys. Metal alloys may contain at least one of the following element groups: brass (Cu—Zn), bronze (Cu—Sn), stainless steel (Fe—Cr—Ni) and steel (Fe—C).

The term "electrically conductive material" may in this document be understood to refer both to a "uniform" material (e.g. pure iron) and to a material component or plural material components of a composition of different materials. In particular, the term "electrically conductive material" may relate at least to one single substance (e.g. at least one bond component, e.g. conductive iron, in a metal oxide that is non-conductive as a whole) or to a material composition (e.g. an alloy).

According to a further embodiment example, the auxiliary heating material may have a magnetic material, in particular a ferromagnetic and/or a ferrimagnetic material.

Ferromagnetism occurs for particular metals and alloys, while ferrimagnetism may be observed in particular for oxidic materials such as magnetite (or lodestone) and ferrites. The hysteresis curves of ferromagnetic and ferrimagnetic materials may run identically in principle, however, for ferrimagnetic materials, the saturation magnetization is typically lower. For both [material types], the loss of the strong magnetizability may occur at the Curie temperature. For both, there also may exist hard- and soft-magnetic materials.

Ferrimagnetic materials may have lower eddy current losses, because their conductivity may be lower, by orders of magnitude, than that of the metallic ferromagnetic materials. Consequently, in ferrimagnetic materials, the proportion of inductive heating, which may be based on eddy currents, may be much lower.

In order to ensure a high inductive heat input, which may be based on cyclic magnetization losses (or losses due to reversal of magnetism), the magnetic material should have a relatively high coercive field strength. This may namely be a direct measure for cyclic magnetization losses, which may be determined in the known manner by the area that may be enclosed by a magnetic hysteresis curve.

According to a further embodiment example, the electrically conductive material may be a ferromagnetic material, which may have a Curie temperature that is lower than 460° C.

This embodiment example is based on the finding that by the use of a ferromagnetic material having a Curie temperature, which may be suitable with respect to the material of the two objects to be connected, an automatic temperature limitation may be given for a thermal connection process. This may mean that at a Curie temperature, which may on the one hand be sufficiently high in order to melt the plastic material of at least one of the two objects, and which may on the other hand be not so high that the plastic material is brought to a temperature, which may lead to a thermal destruction of at least a part of at least one of the two objects. Such a thermal destruction may be given, for example, in that the object in question may melt on to an extent that its form (or shape) may change not negligibly during the thermal connection process. In particular, the ferromagnetic material should have a Curie temperature, which, insofar as this Curie temperature is reached also in a thermal connection process, may result only in a melting-on of a surface layer of at least one of the two objects within a time period that may typically be required for a thermal connection process.

The term "ferromagnetic or ferrimagnetic material" may in this document be understood to refer both to a "uniform" material having a uniform "Curie temperature", and also a material component or plural material components of a composition of different materials. In particular, the term "ferromagnetic or ferrimagnetic material" may relate at least to a single substance (e.g. at least one alloy component), or to a material composition (e.g. alloy).

Upon reaching the Curie temperature of the heating means and/or of the auxiliary heating material, the cyclic magnetization losses may cease to exist, and the coupling-in of energy into the heating means may be reduced accordingly, because only the possibly occurring electrical losses may contribute to a (further) heating of the heating means. As a function of the concrete embodiment of the heating means, this ceasing to exist of the energy input caused by the cyclic magnetization losses may already suffice for a temperature limitation. As the case may be, an according reduction of the coupling-in of energy may also be recognized by an induction generator, from which then "less power is taken out". In this connection, the induction generator may be considered as the primary side of a whole heating system, which may consist of the induction generator and the (secondary sided) heating means. As set forth hereinbefore, the heating means at the secondary side may not represent however a secondary coil of a transformer. A recognition of a reduced withdrawal of power may be used as a signal for controlling the induction generator such that the inductive energy transfer may be reduced further or even switched off.

According to an embodiment example, the ferromagnetic or ferrimagnetic material may have a Curie temperature, which may be lower than 400° C., in particular lower than 300° C., and further in particular lower than 250° C. This may have the advantage, that a high form stability of the two objects to be welded together can be ensured also for plastic objects, which may have a comparably low melting point, even for a longer inductive welding process and/or for a welding process having a high inductive primary energy (generated by a generator).

A Curie temperature significantly above the melting point of the participating plastic materials may contribute to a faster heating during the welding process, and thus may help to a shortening of the working time for the welding process. In the case of a relatively high Curie temperature, the heating means may have to be optimized in respect of heat dissipation, heat capacity and heating rate to that effect that the energy, which may be quickly accumulated in the heating means, may be dissipated to the plastic material in such a way that the latter is not damaged. As will be described subsequently in detail, the transition region of the loss of the ferromagnetic properties, which may make an appearance macroscopically, may be spread and/or shifted by the use of materials having different Curie temperatures, and thus, the function of the temperature limitation may additionally be configured.

According to embodiment examples, the ribbon-type structure may have plural ferromagnetic or ferrimagnetic materials, which may have different Curie temperatures. This may have the advantage that by a suitable mixture of the proportion (mass or volume ratios) of the different ferromagnetic materials an average Curie temperature can be adjusted, which may be optimum for the respective application. The described different ferromagnetic materials may also result in that at least two different Curie temperatures can be associated to the heating means. This may mean in practice that at the beginning of a connection process, when the temperature of the heating means and the surrounding plastic material may still be relatively low, both materials may contribute to an inductive heating with a comparably high heating power. When the temperature later reaches a value, which is above the Curie temperature of the respective material, which has the lower Curie temperature, then the heating process may take place only with a comparably lower heating power. This may enable in an advantageous manner a particularly precise control of the thermal connecting of the two objects.

It is pointed out that such a step-wise control of the heating power may be realized in principle with an arbitrary number of ferro- or ferrimagnetic materials with respective different Curie temperatures. In practice however, it may be sufficient for many applications, when the ribbon-type structure has only two ferro- or ferrimagnetic materials with different Curie temperatures.

According to an embodiment example, the ribbon-type structure may have an electrically non-conductive matrix material and a plurality of magnetic, in particular ferromagnetic and/or ferrimagnetic, and/or electrically conductive particles, which may be embedded in the matrix material, and which may be electrically isolated from each other. This may have the advantage that the described heating means, which may prevent a short-circuit current, may be handled for an inductive welding process from the point of view of a user such as this may be the case for conventional heating means. In particular, the heating means may, as it is common, be wound completely around the first inner object and with a certain spatial overlap of the two (longitudinal) ends.

In an embodiment, the matrix material may for example be a plastic ribbon. The particles may consist of a ferromagnetic material or at least have such a material. The matrix material may for example be polyethylene (PE).

According to a further embodiment, the particles may have ferrites. The ferrites may be present as micro- or as nano-scaled particles.

According to an embodiment example, the matrix material may have a specific electric resistance of at least 1 Ohm/mm$^2$, in particular at least 100 Ohm/mm$^2$, and further in particular at least 10000 Ohm/mm$^2$. Thereby, it may be ensured that macroscopic currents and in particular short-circuit currents may be prevented in the heating means or are at least reduced to a diminishingly low current value.

In an embodiment, the matrix material may be a suitable plastic material or may have such a material. The plastic material may be different from, or may be the same as, the plastic material of at least one of the two objects to be welded together.

According to an embodiment example, the matrix material may have at least one of the following materials:
(a) thermoplastic polymers, in particular polyolefins, such as e.g. PE, PP, PB, CPE, COC, EVA;
(b) polystyrols and their co-polymers, such as e.g. ABS SAN;
(c) elastomers, such as e.g. TPE, EPDM, SBR, NBR, BR;
(d) polyesters, such as e.g. PET, PBT, PEN, PLA, PVA;
(e) halogen polymers, such as e.g. PVC, PVF, PVDC, PVDF, PTFE;
(f) polyamides, such as e.g. PA4.2, 4.6, 6.6, 6.10, 4.10, PA6, 11, 12, as well as, respectively, co-polymers and/or mixtures thereof.

According to a further embodiment example, the ribbon-type structure further may have two plane (or two-dimensional) carrier elements, wherein the auxiliary heating material may be embedded between the two carrier elements.

In a welding process, one of the two carrier elements may face the first inner object, and the second one of the two carrier elements may face the second outer object. In this way, the two carrier elements may be adapted in an advantageous manner to the respective object in respect of their mechanical, structural and/or chemical properties. If the need may be, the two carrier elements may consist of the same material or of different materials.

In an embodiment, the carrier elements may be for example carrier films (or sheets) that may be pre-configured as semi-finished products. This may significantly facilitate the manufacture of the described heating means. At least one of the two carrier films may be a so-called hot melt adhesive film, which may be able to connect also non-thermoplastic materials.

According to a further embodiment example, a plurality of openings may be formed in the ribbon-type structure. The openings may be dimensioned (or sized) such that molten-on plastic material of the first inner object and/or of the second outer object may intrude and may connect to the molten-on plastic material of the respective other object. Alternatively, or in combination, the openings may be filled with a plastic material, which may connect to the molten-on plastic material of the first inner object and/or of the second outer object.

It is pointed out that for a continuous electrically conductive heating means, the openings, which may be formed in particular in the ribbon-type structure, would be responsible for the negative effects of an asymmetry with respect to the current direction. These may result namely in that, upon a close look, the ribbon-type structure may have a plurality of electrically conductive "ligaments" (or division bars). In the case of a short-circuit current, the ligaments along the circumferential direction would carry a greater current than the ligaments in the axial direction.

Thus, in the heated state, both plastic materials may flow through the formed openings, such that a plurality of small welded connections may form through the openings in the ribbon-type structure. This may result in a particular high stability (or rigidity) of the resulting thermal connection upon cooling down.

According to a further embodiment example, the ribbon-type structure may be interrupted materially (or physically) along the circumferential course. This may mean, that the interrupted conductivity may be caused, as the case may be, among others by a macroscopic interruption of the ribbon-type structure that may be laid alongside around the first inner object. Stated demonstratively, there may be no spatial overlap between the two ends of the heating means (which ends may be arranged opposite to each other) and/or of the band-type structure, the spatial position of which may be determined by a longitudinal axis of the ribbon-type structure, which may fall together with the circumferential direction in a welding process. A macroscopic interruption may be located between the two ends of the heating means.

If the heating means shall be interrupted not only electrically but also materially (or physically), then the heating means may be inserted between the two objects also with a certain mechanical allowance for clearance (or tolerance), without worrying that bulges, rubble mounds and/or warpages of arbitrary type develop during a welding process in the case of a certain shrinking of the second outer object, in particular a bushing.

The described material interruption may have the advantage, that the ribbon-type structure can be manufactured from an electrically conductive volume material (or bulk material) or areal material (or plane material) and/or of a ferromagnetic volume material or areal material having all the positive properties in particular in view of a high mechanical stability (or rigidity) and/or a high temperature stability, wherein short-circuit currents may nevertheless be prevented. In such materials, the heating of the heating means may occur on the basis of eddy currents preferably close to the surface of the respective body due to the known skin effect, in particular at higher frequencies. This may result in that thinning edge zones (e.g. ends of the ribbon-type structure) may heat up faster than the centers of the said bodies. This may promote in an advantageous manner in particular the heating of outer regions, which may result in a further spatial homogenization of the heat development.

According to a further embodiment example, the end of the ribbon-type structure may have a corrugated (or waved), serrated (or jacked) and/or meandering contour.

Due to the above-described skin effect, a formation of eddy currents (dependent on the inductive excitation frequency) may be effected more or less strongly preferably at the surface of an electrically conductive and in particular ferromagnetic material. The described, non-smooth contour of the at least one end may provide however for an enlargement of the surface. Thereby, a sufficient heating of the plastic material can be ensured in the region of the interruption also despite a macroscopic interruption that may reliably prevent a short-circuit current, because the concentration of eddy currents in the area of the at least one end may provide for an according stronger heating.

In an embodiment, both ends of the ribbon-type structure may have such a non-smooth contour. In this way, the interruption may be heated particularly strongly from both sides. Stated differently, both ends may share the necessary increased heating power such that the homogeneity of the heating due to the interruption may be impaired only somewhat strongly.

Stated demonstratively, by a non-smooth contour at both ends of the heating means, a longer interruption can be realized without worrying a defective welding. The two non-smooth ends may namely provide for a sufficient heating of the interruption.

According to a further embodiment example, the heating means may further have a ribbon-type carrier, to which the ribbon-type structure is attached (or fixed). Herein, the ribbon-type carrier may have, along a longitudinal direction of the ribbon-type structure, a greater dimension (or size) than the ribbon-type structure. In addition, the ribbon-type carrier may consist of an electrically non-conductive carrier material. This may have the advantage, that the heating means may be so long that it can be wound completely around the first inner object for an inductive heating process, wherein it may be ensured by an according short embodiment of the ribbon-type structure that the heating means may not represent a closed secondary coil with the above-described disadvantages of the formation of short-circuit currents.

In an embodiment, the ribbon-type carrier may have an electrical conductivity, which may be the same as the electrical conductivity of the above-described matrix material. Furthermore, the ribbon-type carrier may have a carrier film that may be pre-configured as a semi-finished product or may have such a film. The carrier film may also be a so-called hot melt adhesive film, which may be capable to connect also non-thermoplastic materials. Preferably, the ribbon-type carrier may also have two carrier films, wherein the (comparably short) ribbon-type structure may be located between the two (comparably long) carrier films. Herein, the two carrier films may be adapted to the respective object in respect of their mechanical, structural and/or chemical properties. If the need may be, the two carrier films may consist of the same material or may have the same material. Of course, also different materials can be used.

According to a further embodiment example, the ribbon-type structure may have a structure in layers (or layer-wise composition) of different materials, which may have in particular a different hardness, a different elasticity and/or a different ductility.

In an embodiment, by a suitable adaptation of the proportions (or amount ratios) of the different materials, it may thus be possible to modify the mechanical stretching properties of the heating means such that upon a stretching selective deformations may result, which may contribute to an improvement, that is to an increased mechanical stability (or rigidity), of the produced welding connection. The deformations may in particular be height differences and/or rounding-offs (or honings) at the transition between the surface of the ribbon-type material to the openings.

According to present insights, in particular a combination of two or more layers of the following metallic alloys may be suitable for the described layer-wise structure: Cu—Al, Fe—Cu, Fe-stainless steel, Cu—Sn, Fe—Al, Al—Mg. In order to achieve optimum mechanical stretching properties for the respective application, it may also be possible to adapt, within an alloy, the proportions between the metals participating in the alloy.

In order to investigate the influence of different elasticities on the quality and in particular on the stability of a welded connection, a series of experiments has been carried out by the inventors. Herein, it has turned out that by a selective (or targeted) adjustment of the longitudinal elasticity of the ribbon-type structure, a significant improvement of the welding result may be achieved. Herein, the longitudinal elasticity is the elasticity of the ribbon-type structure along the tangential direction defined above. In a welding together of pipes, this longitudinal extension (or elasticity) is the tangential direction along the cylindrical lateral surface of the respective pipe.

In experiments carried out by the inventors, it has turned out in particular that for a too low longitudinal elasticity, i.e. if the heating means is too stiff and/or too rigid, the heating means cannot build up the necessary contact pressure over the whole connection area, which contact pressure may be required for a systematic and preferably anisotropic liquefaction of the respective plastic material. Likewise, also for too great a longitudinal elasticity, the desired contact pressure may be present at no location. It has turned out that longitudinal elasticities of 30 N to 300 N for a relative stretching of 0.1%, and in particular of 60 N to 200 N for a relative stretching of 0.1%, result in particularly good welding results. It is pointed out that herein, the longitudinal elasticity may correspond to the spring constant of the ribbon-type structure (compare Hook's law).

For the reason of completeness, it is pointed out that the structure in layers may also have plural layers of materials having different Curie temperatures. This may have the advantage that for adjusting at least one suitable Curie temperature for the specific application case, no alloy of different materials having different Curie temperatures may have to be manufactured.

According to a further embodiment example, the heating means may further have an adhesive force changing layer, which may be attached to, or formed at, at least one surface of the ribbon-type structure.

In an embodiment, the adhesive force changing layer may contribute in an advantageous manner to that the flow behaviour of molten-on plastic material, which may come in contact with the heating means, can be adjusted in view of a particularly stable welded connection after the cooling down. Namely, if the surface of the two plastic objects liquefies in the course of the thermal connecting and/or the welding together, then states of captured air bubbles (or gas pockets) may develop, if all pneumatic connections "to the outside world" may have already closed around the respective heating position. The pressure increase that may occur herein may act helpfully for supporting the desired preferential flow direction of the liquid plastic through the heating means. Herein, it may be of significance that the wetting of the surface of the heating means may be accompanied by optimum adhesive effects, so that the pathway of the lowest resistance of the liquid plastic material may be the pathway through the openings of the heating means, and that air pockets may not stay in the interior of the openings. Thereby, it can be prevented that the molten-on plastic material can permeate (or percolate) the heating means (through the openings).

According to a further embodiment example, the adhesive force changing layer may have (i) an adhesive force strengthening layer at the surface of the ribbon-type structure and/or (ii) an adhesive force reducing layer at the sidewalls of the openings.

In an embodiment, by an adhesive force strengthening between the surfaces of the ribbon-type structure and the respective plastic object, also a solid connection between the surface of the ribbon-type structure and the respective plastic object may be produced in addition to the welded connection between the two plastic objects. For this purpose, preferably both (plane) surfaces of the ribbon-type structure may be provided with an adhesive force strengthening layer.

In an embodiment, by an adhesive force reducing layer in the region of the openings, the flow behaviour of liquefied plastic material through the ribbon-type structure may be improved. Thereby, a mechanically particularly stable direct connection between the two plastic objects may result after the cooling down.

In some further embodiments, the adhesive force changing layer may be an oxide layer. Alternatively or in combination, the adhesive force changing layer may also have carbonates.

As has been found by the inventors of the described heating means, an oxide layer, and in particular a metal oxide layer, may also be a (selectively formed) oxide layer at the surface of the ribbon-type structure. Such oxide layers may be formed, for example, by a selective storing of the ribbon-type structure in an atmosphere, which may contain at least 10% of an oxygen modification, thus nascent (atomic) oxygen (O), molecular oxygen ($O_2$) and/or ozone ($O_3$), and in which the rest of the atmosphere may be formed of an inert gas. The inert gas may be a noble gas, preferably He, Ar, Ne, and/or nitrogen.

In an embodiment, the metal oxide layer may contain at least one of the following elements: Fe, Cr, Ni, if the need may be also Cu, Al, Zn, Sn as well as rare earth metals. Furthermore, the metal oxides may contain specifically at the surface portions of at least one of the following elements: Au, Ag, Cu, Rh.

In this relation, surface layers, which may contain carbonates in addition to the metal oxides, have turned out to be particularly effective. This may be achieved by an addition of small amounts of $CO_2$, wherein the small amount of $CO_2$ may amount to less than 10 weight percent (wt. %) and preferably less than 1 wt. %, in order to shift the formation of the desired metal oxides not too much in favour of carbonates.

A particularly suitable layer composition may be formed for example at temperatures of 5° C. to 120° C., preferably from 15° C. to 80° C., over a time period of at least 48 hours, preferably at least 96 hours. In order to significantly reduce the reaction duration of the mixture of oxygen, carbon dioxide and/or inert gas, the surface of the ribbon-type structure may also be impacted by an atomic plasma, which may contain beside a protective gas (preferably argon) also the reactive gas components $O_2$ and $CO_2$. In this way, the desired adhesive force changing layer may be built up within a few seconds or even fractions of seconds. Furthermore, also other elements, such as for example Si, B, Ti and/or Zr, may be integrated in the surface of the ribbon-type structure by the addition of according precursor gases. In this relation, it has turned out that in particular Si and Ti can contribute to the production of a particularly suitable adhesive force changing layer. By a suitable selection of the composition of the adhesive force changing layer, the desired (adhesive) properties thereof can be adjusted.

In some embodiments, the oxide layers may have a layer thickness of less than 10 µm, in particular less than 500 nm, preferably less than 50 nm, or ideally less than 10 nm.

It is pointed out that for a structure in layers of oxides having the mentioned properties in particular very thin layers may be advantageous in the sense of an adhesion control, because the negative influence of the brittleness of oxides may be minimized thereby, and the adhesion-controlling properties may nevertheless be already developed to the full extent. Very good results have been obtained in experimental investigations already with layer thicknesses of less than 10 nm (typically 1 nm to 5 nm).

According to a further embodiment example, the openings may have an average distance s from each other, which may satisfy at least one of the following relations with respect to a thickness d of the ribbon-type structure: $0.5<s/d<2$; $0.7<s/d<1.5$; $0.8<s/d<1.3$; $0.9<s/d<1.1$.

As it has turned out in experimental investigations, the described geometries of openings and/or holes may result in a qualitatively particularly tight welded connection. Herein, the openings may be arranged either (a) regularly (with a fixed offset between openings neighbouring in different directions), or (b) irregularly.

Stated demonstratively, beside the chemical surface constitution of the ribbon-type structure, also its geometry may be relevant for the quality of a welding. The final tightness of a welded connection may thus be particularly high for a suitable geometry of holes and/or openings, because no anisotropic stability values in relation to shearing forces may show up after the hardening of the liquefied plastic material. Also, a chipping of parts of a plastic object may be prevented by the choice of a suitable hole geometry, wherein a chipping may comprise in particular a spatial separating of a region with temporary liquefied plastic from a region with always solid plastic.

In certain embodiments, in absolute numbers, the average distance s may be in the range between 0.1 mm and 5 mm. The same may hold for the thickness d, which may also be in the range between 0.1 mm and 5 mm.

According to a further embodiment example, a transition between the plane (or two-dimensional) surface of the ribbon-type structure and an opening may be rounded off (or chamfered). Thereby, in an advantageous manner, "sharp path changes" and/or abrupt directional changes of the liquid plastic on its way into the respective opening may be avoided. This may result in a significant improvement of the flow behaviour.

The term "rounding-off" (or chamfering) can be understood in this relation in particular such that the transition from the plane surface of the ribbon-type structure to the respective opening is free from corners and edges. The rounding-off thus may not necessarily have a radius of an imagined circle.

In an embodiment, in the case of cylindrical openings, the transition may be, in a top view on the ribbon-type structure, a circle and/or an annulus. Herein, the width of the annulus may depend on the degree of the rounding-off. A particularly simple rounding-off may be realized by a countersinking, which may be for example performed by a countersunk head drill bit. Herein, the area of the rounding-off may get the shape of a truncated cone.

In some embodiments, the rounding-off may have a radius of more than 10 µm, in particular more than 70 µm, and further in particular more than 300 µm.

In other embodiments, the rounding-off may have a radius of more than 1 µm, in particular more than 3 µm, and further in particular more than 6 µm.

According to a further embodiment example, at least some of the openings each may have a longitudinal axis, which may form an angle that may be different from zero with a surface normal of the surface of the ribbon-type structure.

Stated demonstratively, at least some of the openings formed in the ribbon-type structure may be inclined openings. This may result in that in a flow direction, the directional change of the liquid plastic on its way into the opening may be comparably small (in particular smaller than 90°). Even if the directional change of the liquid plastic on its way into the opening is greater (in particular greater than 90°) in the opposite flow direction, such an anisotropy may result in an overall improved flow behaviour. The longitudinal axes of different openings may also be different, wherein in regions with flow directions that may be expected to be different the longitudinal axes of the respective openings may be preferably inclined respectively against the flow direction.

It has turned out furthermore that for inclined openings the mechanical stability of the plastic objects, which may be welded to each other, may be increased. In particular, for different directions and/or orientations of the openings, a tensioning with the ribbon-type structure may occur upon the cooling down and the solidifying related therewith. This may increase the total stability of the welded connection according to the principle of "prestressed concrete".

According to a further embodiment example, the ribbon-type structure may have a surface having elevations and recesses, wherein an average height different between the elevations and recesses may be in the range between 0.01 mm and 2 mm, in particular in the range between 0.1 mm and 1.5 mm, and further in particular in the range between 0.5 mm and 1.2 mm.

In an embodiment, the surface roughness may be based on thickness differences of the ribbon-type structure and/or on a plurality of local deformations and/or deflections.

The roughness described herein may be of advantage in particular in cases, when the second outer object, for example a bushing, may consist of a plastic material having thermal shrinking properties. Thereby, during the welding process, a two-sided contact pressure may be exerted on the heating means. By the rough formation of the surface of the ribbon-type structure, it may be achieved that the transition to the plastic material may be subjected to a higher contact pressure at the points of the greatest elevation than in other regions. Due to the higher pressure, a better heat coupling may be achieved, which in turn may result in an earlier melting-on in the corresponding region. This pre-melt may now preferably be pressed into the opening during the slow softening of the whole plastic part, which may result in a particularly strong connection between the plastic parts.

According to a further embodiment example, the heating means may further have at least one further ribbon-type structure, which may be arranged beside the ribbon-type structure. The further ribbon-type structure may be oriented at least approximately parallel to the ribbon-type structure.

In an embodiment, the distance between two mutually neighbouring sheets or (tracks) may amount to, for example, between 0.5 mm and 50 mm, in particular between 0.8 mm and 10 mm, and further in particular between 1 mm and 1.5 mm.

Stated demonstratively, the heating means may be formed with at least two sheets of ribbon-type structures, and as the case may be with suitable carrier elements and/or carrier films. This may have the advantage, that heating means with arbitrary widths can be manufactured from only one type of ribbon-type structure, and as the case may be suitable carrier elements and/or carrier films. Herein, the heating means may be multi-pieced, i.e. the ribbon-type structure and the at least one further ribbon-type structure may not be connected to each other and are, prior to a welding process, inserted separately between the two objects to be welded together.

In an embodiment, the different ribbon-type structures may however also be connected to each other (at their longitudinal sides). Herein, the connection may be realized directly, for example with a particular overlap. Alternatively, the ribbon-type structures may also be connected via a non-conducting and/or non-ferromagnetic material, which, in accordance with the previously described separate configuration, may result in that the heating means may be formed as at least two separate secondary coils in relation to an inductive welding process. Preferably, a wide carrier element and/or a wide carrier film or a wide ribbon-type carrier may be used for an (axial) connection of plural ribbon-type structures.

According to a second exemplary embodiment of the invention, there is described an arrangement having (a) a first inner object, which has a first plastic material; (b) a second outer object, which surrounds the first inner object at least partially and which has a second plastic material; and (c) a heating means of the type described above, which surrounds the first inner object at least partially along a complete circumferential course around the first inner object and is located between the first inner object and the second outer object.

Also the described arrangement is based on the finding that by a selective (or targeted) interruption of the current flow along the circumferential direction, it can be prevented in a simple manner that a short-circuit winding results around the first inner object, which would, in an induction welding process, may result in an induced current flow (preferably) around the whole first inner object. Thereby, and as has been explained in detail already above, an asymmetry (of the direction) of the current flow, which may be responsible for the heating, in the heating means may be prevented and a uniform heating of the heating means may be ensured during an inductive welding process.

In an embodiment, the two plastic materials may be equal. This may have the advantage, that equal plastic materials may connect particularly well, so that the tightness of the resulting welded connection may be particularly high.

In some embodiments, the first plastic material and/or the second plastic material may be a composition (of plural plastic materials) or may have an additive, which may effect a reactive change in the course of the heating and/or the melting. Such reactions may be for example:

(A) cross-linking by polymer addition (also epoxy group with amine, amide, acid, acid anhydride, alcohol, phenol, thiol or isocyanate (also blocked with amine, amide, alcohol, phenol, thiol);
(B) cross-linking by hydrogen elimination by peroxides and/or azo compounds;
(C) cross-linking of polymer chains by vinyl polymerization, silane vinyl addition, thio-click-addition, azide-click-addition.

Stated demonstratively, also reactive hot-melt adhesives may be involved in the thermal connecting process. In particular, as the case may be, also the polymer surfaces to be connected of the first inner (polymer) object and the second outer (polymer) object may interfere in the above-mentioned reactions.

According to an embodiment example, the heating means may be integrated in the first inner object and/or in the second outer object. Thereby, the handling and/or the performing of an inductive welding process may be simplified, because in the case of a welding together of only the first inner object with the second outer object (disregarding a coil of the induction generator), only two objects may have to be handled by an operator.

In this relation it is pointed out that the expression "is located between the first inner object and the second outer object" is to be understood, for an at least partial integration of the heating means, to that effect that the heating means may be located between two edges of the two objects facing away from each other, wherein a first edge may be associated to the first inner object and the second outer edge may be associated to the second outer object.

In the case of the above-described embodiment examples, in which the ribbon-type structure may have an electrically non-conductive matrix material and a plurality of electrically conductive particles embedded in the matrix material, the particles, in particular ferromagnetic particles, may be integrated as small electric conductive elements already in the plastic material of the corresponding object. The respective object having the integrated heating means may be manufactured by a two-component injection moulding method. Herein, the first component may be for example polyethylene (PE). The second component may be for example the heating means, which in turn may be a mix of (i) an electrically conductive and in particular ferromagnetic material of a suitable size and (ii) PE.

According to a further embodiment example, the arrangement may further have a third inner object, which may have a third plastic material, wherein (i) the second outer object also may surround at least partially the third inner object, and wherein (ii) the heating means may be located also between the third inner object and the second outer object. This may have the advantage, that by the described arrangement, more than two plastic objects may be connected to each other, so that a particular broad technical field of applications may result for the described arrangement.

In an embodiment, the third plastic material may be the same plastic material as the first plastic material and/or the second plastic material. Hereby, the same advantages may result, which are described above for two equal plastic materials.

According to a further embodiment example, (a) the first inner object may be a plastic pipe, (b) the third inner object may be a further plastic pipe, and (c) the second outer object may be a plastic bushing, which may surround two mutually facing ends, one end of the plastic pipe and a further end of the further plastic pipe.

By the described arrangement, a pipe conduit, which may be composed of plural plastic pipes, may be formed in an advantageous manner. In order to ensure a low-resistant flow-through of a fluid at the position of the connection of the two plastic pipes, the two frontal ends of the two involved plastic pipes may have a distance to each other that is as small as possible.

In an embodiment, the plastic pipes may be long-distance heat pipelines (or district heating pipelines), which may be thermally insulated, as the case may be, to the outer side and/or to the inner side. Optionally, the long-distance heat pipelines may, in a known manner, include an inner pipe and/or a core pipe of metal (e.g. steel), wherein assembled core pipes may be welded to each other.

According to a third exemplary embodiment of the invention, there is described a system, which has (a) an arrangement of the type described above, and (b) a generator for generating an electromagnetic field, which couples a coil device of the generator inductively to the heating means.

Also the described system is based on the finding that by a selective electrical interruption of the current flow along the circumferential direction, short-circuit currents can be prevented, and thereby, a particularly high spatial homogeneity of the heating of the heating means can be ensured. Thereby, welded connections having a particular high quality can be produced.

According to an embodiment example, the coil device may have one or more individual coils.

According to an embodiment example, the coil device may be an open coil device in relation to the arrangement. This may mean that the coil device can be wound around the arrangement also in a case, where the arrangement may have three objects, as is the case in the thermal inductive connecting of two (in principle infinitely long) plastic pipes, which may be connected at their assembly position by a bushing. In contrast to a closed coil device, which may be slipped on a pipe end of the respective pipe and then may have to be slided along the pipe to the assembly position, it may be sufficient for the described open coil device if this is simply wound around the arrangement in the region of the bushing. Stated demonstratively, the coil device may be wound around the bushing like a flexible and elongated inductive hot plate.

In an embodiment, the open coil device may be so long that it may surround the bushing with a certain overlap. In this case, care should be taken that the inductive heating power does not become too large in the region of the overlap. The open coil device may also be precisely so long that it may surround the bushing without overlap and also without a gap between the two ends. Furthermore, the coil device may be so short that a gap may result between the two ends. In this case, care must be taken that the inductive heating power in the region of the ends is sufficiently large such that the bushing may be heated sufficiently also in the region of the gap.

A variable inductive heating power can be effected for example by a suitable control and/or current feed of individual coil sections and/or by a variable density of coil wires.

According to a further embodiment example, the coil device may have a coil having non-circular windings that may be intertwined in each other. This may have the advantage, that the coil device can be laid around the arrangement consisting of at least two objects to be welded to each other in an easily manageable manner.

According to a further embodiment example, the coil device may have a plurality of individual coils. This may have the advantage that the geometry of the coil device may be adapted to the respective application case in an easy manner. In addition, the individual coils or groups of coils may also be controlled individually for a suitable configuration of the electrical terminals.

Furthermore, each at least one individual coil may be considered as a coil module, which may be coupled to another coil module as the need may be. Thereby, the length of the coil device may be increased.

The use of plural individual coils may have the advantage, that these can be packaged individually for in particular often very rough working conditions, and thus can be protected from pollution and/or damage. A further advantage for the use of plural individual coils can be seen in that, as far as these are controlled and/or fed with current separately from each other by an induction generator, that upon a failure of one coil not the whole coil device may become unusable.

According to a fourth exemplary embodiment of the invention, there is described a method for thermally connecting two objects each having a plastic material. This method has (a) a spatial arranging of a first inner object, a second outer object, and an above-described heating means such that (i) the first inner object is surrounded at least partially by the second outer object and (ii) the heating means surrounds the first inner object at least partially along a complete circumferential course around the first inner object and is located between the first inner object and the second outer object; (b) an inductive heating of the heating means, such that molten-on plastic material of the first inner object and/or of the second outer object connects directly or indirectly with molten-on plastic material of the respective other object; and (c) a cooling down of the heating means.

Also, the described method is based on the finding that in view of a homogeneous heating, undesired short-circuit currents can be prevented by selectively preventing a short-circuit current along the circumferential direction around the first inner object.

According to an embodiment example, the inductive heating may have an exciting of a coil device of an induction generator for generating electromagnetic waves, which may couple inductively to the heating means. Herein, the electromagnetic waves may have a frequency, which is greater than 8 kHz, in particular greater than 15 kHz and in particular greater than 100 kHz.

Such high frequencies may have the advantage that the coil device can be realized with comparably small coils, which are easy to handle and which can be placed around the arrangement having the objects to be welded together in an at least approximately optimum spatial arrangement. In this way, a very well suitable configuration of the welding system may be established for different applications.

It may hold generally that due to the so-called skin effect, the penetration depth of the electromagnetic waves into the auxiliary heating material decreases within increasing frequency. With a high frequency, the ribbon-type structure may have fine and in particular thin structures, into which the inductive coupling-in of energy may take place. For excitation frequencies in the Megahertz range, even nano-scaled structured auxiliary heating materials can be used. However, in practice, also aspects of the electromagnetic compatibility (EMV) may have to be respected, which may progressively represent a problem for inductive heating processes at higher frequencies. Therefore, too high excitation frequencies may have to be avoided.

In this relation, it is pointed out that by the typical frequency range of induction cooker fields (20 to 200 kHz), a frequency band may be available, which may have to be optimized in respect of EMV for the heating of the heating means as described in this document only in the long wave range, which may be power-insensitive. This may hold in particular for the above-described embodiments having embedded particles.

It is pointed out that embodiment examples of the invention have been described in respect of different invention subjects. In particular, some embodiments of the invention have been described by device claims and other embodiments of the invention by method claims. However, it will become clear for the skilled person immediately upon reading this application, that, unless it is not explicitly stated differently, in addition to a combination of features, which belong to one type of invention subject, also an arbitrary combination of features, which belong to different types of invention subjects, is possible.

Before exemplary embodiment examples of the invention are described with reference to the drawings, some technical considerations in relation to the invention are set forth in the following.

Further advantages and features of the present invention result from the following exemplary description of presently preferred embodiments. The individual figures of the drawings of this document are to be considered as merely schematic and not as drawn to scale.

BRIEF DESCRIPTION OF THE DRAWINGS

FIG. 10 shows an open coil device having intertwisted windings.

FIG. 11 shows, in a top view, a heating means having serrated ends.

FIG. 12 shows, in a cross-sectional view, a heating means, which has a ribbon-type structure, which is arranged on a ribbon-type carrier.

FIG. 13 shows, in a side view, a heating means, which has plural ferromagnetic layers, which respectively have a different Curie temperature.

FIG. 14 shows an arrangement to be welded together and having an inner plastic pipe and an outer bushing, in which respectively a materially closed but electrically interrupted heating means is integrated.

DETAILED DESCRIPTION OF ILLUSTRATED EMBODIMENTS

Figure 1A:
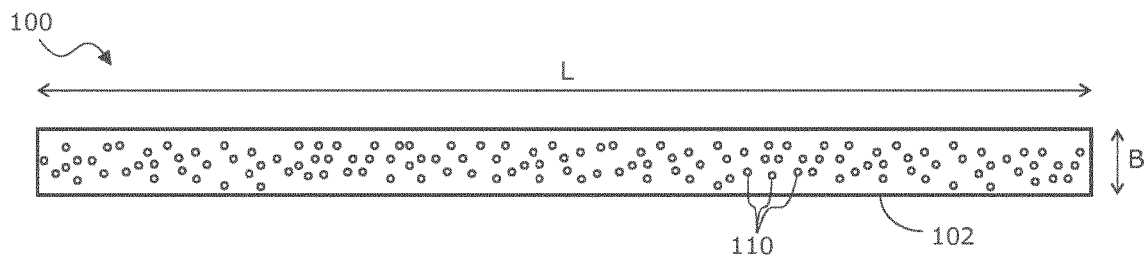
FIG. 1a shows, in a top view, a heating means having a plurality of openings, which are formed irregularly in a ribbon-type structure.

It is pointed out that in the following detailed description, features and/or components of different embodiments, which are equal or at least functionally equal to the corresponding features and/or components of another embodiment, are provided with the same reference numerals or with reference numerals, which are identical in the last two digits to the reference numerals of corresponding equal or at least functionally equal features and/or components. For avoiding unnecessary repetitions, features and/or components, which have been explained already with reference to a previously described embodiment, are not explained any more in detail later.

Furthermore, it is pointed out that the subsequently described embodiments represent only a limited selection of embodiment variants of the invention. In particular, it is possible to combine the features of individual embodiments with each other in a suitable manner, so that a plurality of different embodiments is to be considered as obviously disclosed for the skilled person with the embodiment variants illustrated explicitly herein.

In addition, it is pointed out that space-related terms, such as for example "in front" and "behind", "at the top" and "at the bottom", "left" and "right", etc. are used to describe the relation of an element to another element or to other elements such as it is illustrated in the figures. Accordingly, the space-related terms may apply for orientations, which differ from the orientations that are represented in the figures. It is however understood by itself that all such space-related terms, for the reason of simplicity of the description, relate to the orientations represented in the drawings and are not necessarily limiting, because the respective illustrated device, component, etc., when it is in use, may assume orientations, which may be different from the orientations illustrated in the drawings.

FIG. 1a shows, in a top view, a heating means 100. The heating means 100 may consist substantially of a ribbon-type (or belt-type) structure 102, in which a plurality of openings 110 may be formed, for example by punching. According to the embodiment example represented here, the openings 110 may be spatially arranged irregularly. As has been explained in-depth above, the openings may enable a flowing through of molten-on plastic material through the ribbon-type structure 102 in a welding process.

In preferred embodiment examples, a length L of the ribbon-type structure 102 may be in the range of 40 mm to 3200 mm, and in particular in the range from 60 mm to 800 mm. A typical ratio between the length L and a width B of the ribbon-type structure 102 may be less than 1:10, in particular less than 1:100.

Figure 1B:
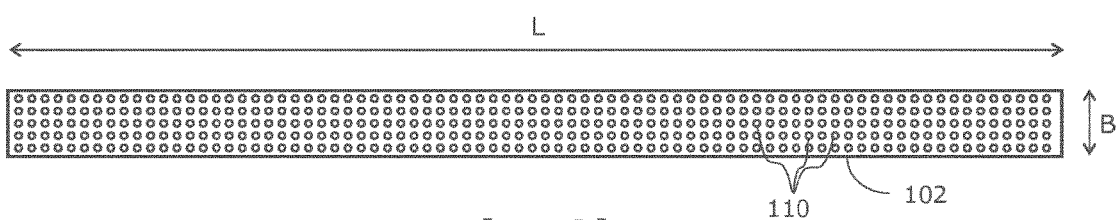
FIG. 1b shows, in a top view, a heating means having a plurality of openings, which are arranged in a regular pattern.

FIG. 1b shows, in a top view, a heating means 200 according to a further embodiment example of the invention. Herein, the openings 110 may be arranged in a regular pattern. In other embodiments, which are not represented, the openings may be offset relative to each other such that a regular pattern may result, too.

Both regularly and also irregularly arranged openings 110 may have an average distance to each other, which may be in the range between 0.1 mm and 5 mm, and in particular in the range between 0.5 mm and 3 mm.

The ribbon-type structure 102 may consist of a perforated metal ribbon (or metal belt). The ferromagnetic material of the ribbon-type structure 102 may for example be steel. In order to achieve an additional, not represented contouring, the perforated metal ribbon may be a metal ribbon that may have been stretched by a sufficient tensile force.

As has been described above, the ribbon-type structure 102 must not compulsory consist of a ferromagnetic material. Beside ferrimagnetic materials, in principle all materials can be used, which can be heated inductively. Such materials are referred to in this document generally as auxiliary heating materials. A suitable material, for which the heating may be primarily based on the electrical conductivity and the eddy currents resulting therefrom, may be e.g. the non-magnetic material aluminium.

In other embodiments, the ribbon-type structure 102 can be a woven or braided roving (or strand, or scrim) of single wires. These may optionally have a functional coating for an improved heat conductivity, a corrosion protection, etc.

Figure 2:
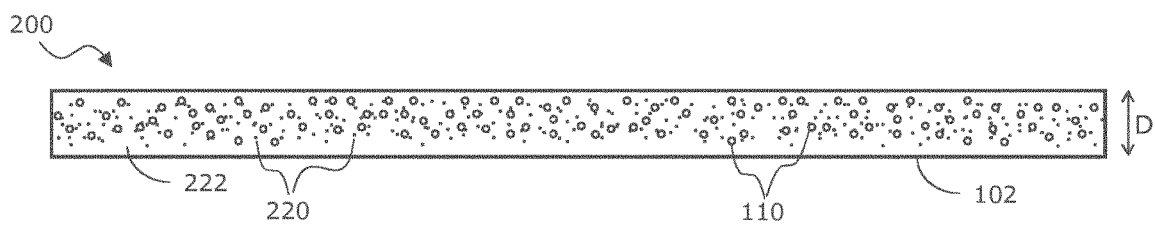
FIG. 2 shows, in a top view, a heating means, which has an electrically isolating matrix material and ferromagnetic particles embedded therein.

FIG. 2 shows, in a top view, a heating means, which has an electrically isolating matrix material and ferromagnetic particles embedded therein. According to the embodiment example illustrated herein, the matrix material may consist of polyethylene (PE) or at least has this. The particles may have an average size having a diameter of less than 1 mm, in particular less than 0.1 mm and further in particular less than 0.01 mm. According to the embodiment example illustrated herein, the particles may be ferrites.

The comparably small ferromagnetic particles may have the advantage that very high frequencies can be used for an inductive heating. Orders of magnitudes for suitable frequencies have been mentioned already above. As has also been mentioned above, at high frequencies, coil devices having different geometries that may be suitable for the respective application case can be used in order to generate the electromagnetic field that may be necessary for an inductive heating.

Figure 3:
FIG. 3 shows, in a side view, a heating means having a ribbon-type structure, which has a matrix material having embedded ferromagnetic particles and two flexible carrier elements embodied as carrier films.

FIG. 3 shows, in a side view, a heating means 300 having a ribbon-type structure, which may have a matrix material 222 with embedded ferromagnetic particles 220 and two flexible carrier elements 324 formed as carrier films. The matrix material 222 may be located between the two carrier films 324. The carrier elements 324 may be films provided with an adhesive agent, to which the matrix material adheres. Such a structure in layers (or layer-wise composition) of the heating means 300 may enable an easy handling of the heating means.

According to the embodiment example illustrated here, the heating means 300 constructed in layers may have a thickness D of 0.5 µm. However, also other thicknesses from 0.1 mm to 3 mm, in particular from 0.2 mm to 2 mm, and further in particular from 0.3 mm to 1 mm, can be used.

Figure 4:
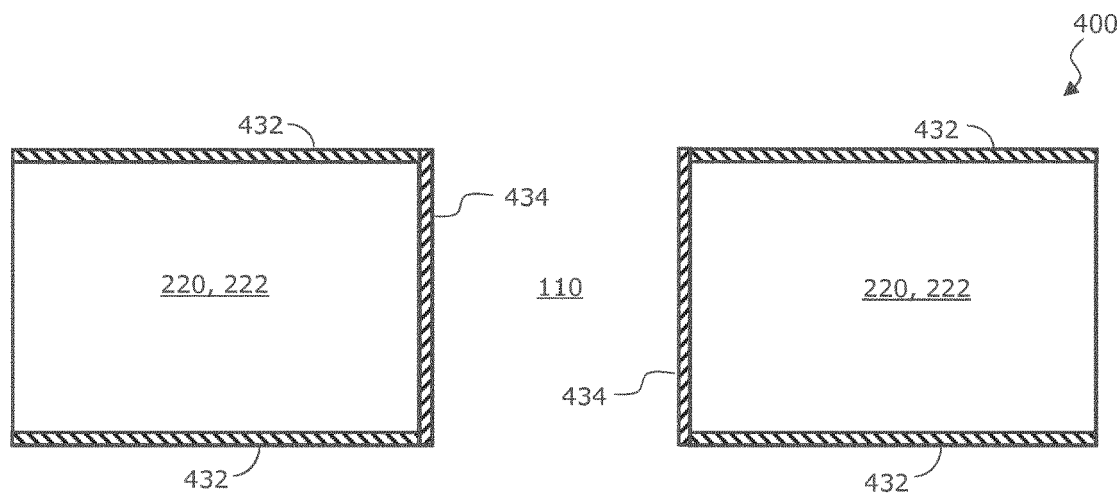
FIG. 4 shows, in a magnified cross-sectional view, a heating means having an opening, wherein respectively one adhesion increasing layer is formed on the two plane surfaces of the heating means and an adhesion reducing layer is formed at the walls of the opening.

FIG. 4 shows, in a magnified cross-sectional view, a heating means 400 having an opening 110 out of a plurality of openings. An adhesion strengthening layer 422 may be formed on the two plane surfaces, i.e. the lower side and the upper side, of the heating means 400, respectively. An adhesion reducing layer 424 may be formed at the sidewalls of the opening 110. Thereby, the flow behaviour of molten-on plastic through the openings 110 may thereby be improved in an advantageous manner, such that a particularly stable plastic connection may be formed through the opening 110.

Furthermore, also a mechanically more or less strong connection between the heating means 400 and the respective plastic object may be produced at the two plane surfaces of the ribbon-type structure 102 by an adhesive force strengthening. This may contribute to a further improvement of the overall welded connection.

Figure 5:
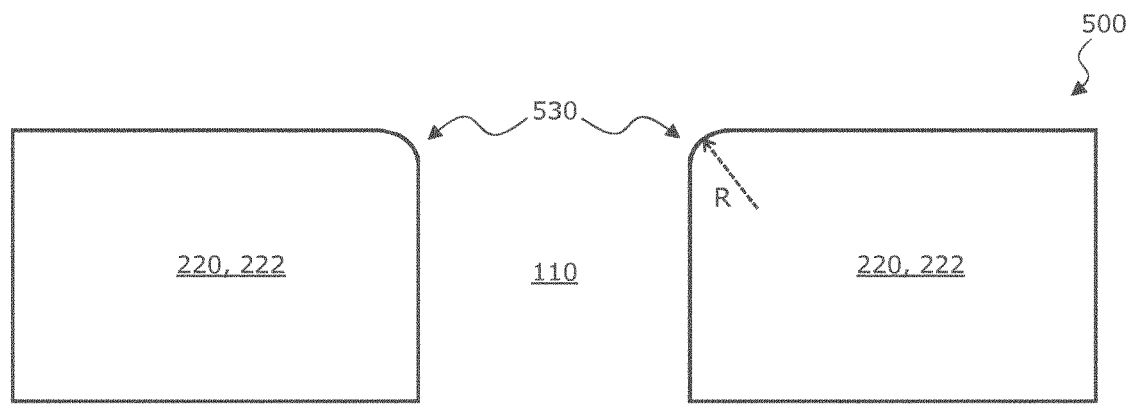
FIG. 5 shows, in a magnified cross-sectional view, an opening formed in a heating means, which opening has a rounding-off at an upper side.

FIG. 5 shows, in a magnified cross-sectional view, a heating means 500, in which a plurality of openings 110 is formed. As can be seen from the exemplary illustrated opening 110, a transition from a plane upper side of the ribbon-type structure to the opening 110 occurs with a rounding-off (or chamfering) 530. This may contribute to that an initially horizontally flowing molten-on plastic material must not flow around a corner when intruding into the opening 110. Thereby, the flow behaviour of the molten-on plastic material into the opening 110 may be improved.

In preferred embodiment examples, a radius R of the rounding-off may be in a range from 1 μm to 100 μm. It is however pointed out that instead of a rounding-off, which may be circular in cross-section, also other types of chamfered edges, for example a countersink, may contribute to an improved flow behaviour of molten-on plastic material into the opening 110.

Figure 6:
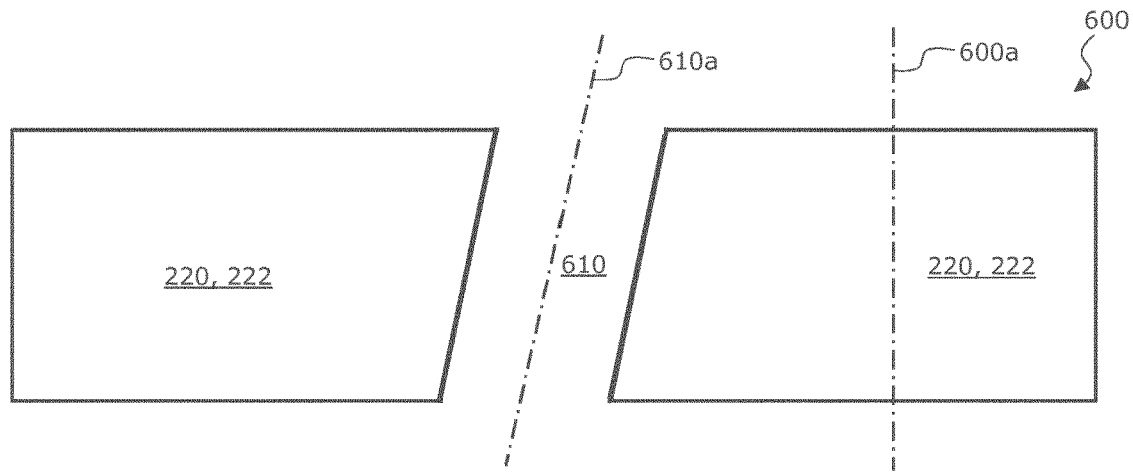
FIG. 6 shows, in a magnified cross-sectional view, a heating means having an inclined opening.

FIG. 6 shows, in a magnified cross-sectional view, a heating means 600, in which an inclined (or slanting) opening 610 may be formed. Herein, the "inclination" of the openings refers to an angle, which may be formed between a longitudinal axis 610a of the opening 610 and a surface normal 600a of the plane surface of the heating means 600. In preferred embodiment examples, this angle may be in a range between 10° and 60°, in particular in a range between 20° and 50°, and further in particular in a range between 30° and 40°.

It is pointed out that also in this embodiment example, the heating means 600 may have a plurality of openings, of which at least some may be inclined openings. For reasons of clarity, only one inclined opening 610 is illustrated in FIG. 6.

Figure 7:
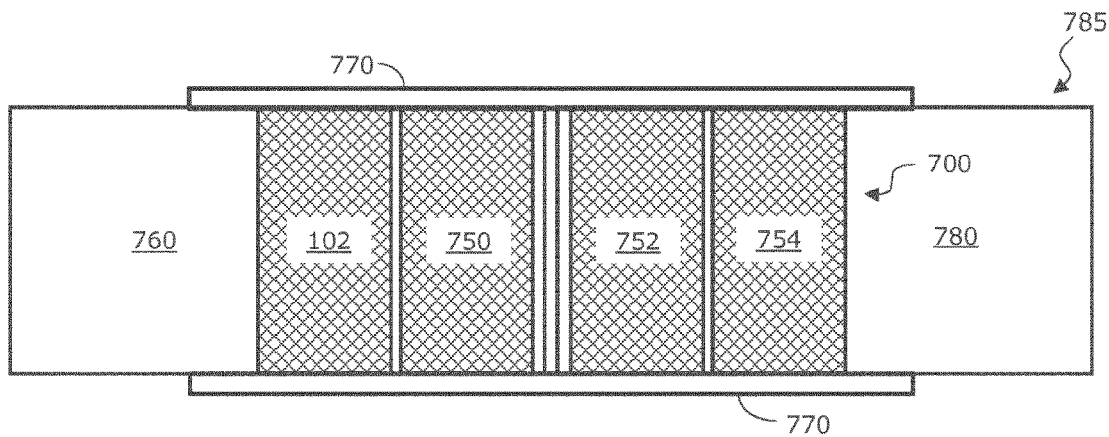
FIG. 7 shows, in a schematic top view, an arrangement having two inner pipes and one outer bushing, which are all welded to each other by a heating means having in total four ribbon-type structures.

FIG. 7 shows, in a schematic top view, an arrangement 785 having two inner plastic objects 760 and 780 each formed as a pipe, and an outer plastic object 770 formed as a bushing, which have all been welded to each other by a heating means 700. According to the embodiment example illustrated here, the heating means 700 may have in total four ribbon-type structures, a first ribbon-type structure 102 as well as three further ribbon-type structures 750, 752 and 754, which may have been wound around the plastic pipe 760 and/or around the further plastic pipe 780 parallel to each other, respectively, with a small distance. As can be seen from FIG. 7, the heating means 700 having four ribbon-type structures may be located between the bushing 700 and the plastic pipe 760 and/or between the bushing 770 and the further plastic pipe 780.

The ribbon-type structures 102, 750, 752 and 754 may be structures, which may be materially closed around the inner plastic objects 760 and 780 (and are only interrupted electrically), and which may have a matrix material and embedded therein ferromagnetic particles, which may be electrically isolated from each other. Alternatively, the ribbon-type structures 102, 750, 752 and 754 may also be both materially and electrically interrupted structures, which are described in more detail in the following. Also, a combination of materially closed structures and materially interrupted structures may be used for the heating means 700.

In this relation, it is pointed out that the FIG. 7 shows the arrangement 785 basically in a top view. For reasons of a better clarity, only the bushing 770 is illustrated in a cross-sectional view.

Figure 8:
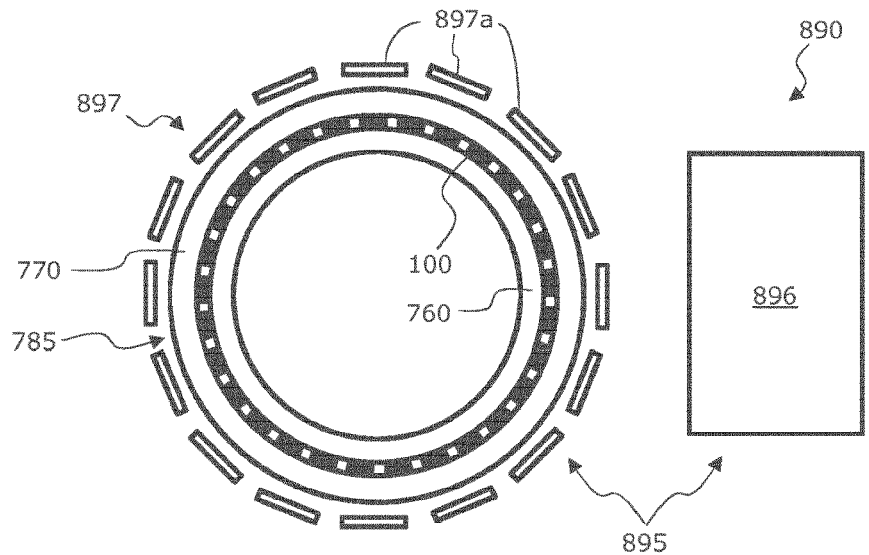
FIG. 8 shows a system having (a) an induction generator, (b) an arrangement to be welded together consisting of an inner plastic pipe and an outer bushing, and (b) a materially closed but electrically interrupted heating means between the inner pipe and the outer bushing.

FIG. 8 shows a system 890 having (a) the arrangement 785, which is represented in a cross-sectional view, and (b) an induction generator 895, which is provided to inductively heat the heating means 100 (and as the case may be also the non-illustrated further heating means), and thus to weld together the bushing 770 with the plastic pipe 760. The induction generator 895 may have an excitation device 896 as well as a coil device 897 having a plurality of excitation coils 897a. The coil device 897 may be arranged around the bushing 770. According to the embodiment example represented here, each one of the individual excitation coils 897a may be fed individually with current by the excitation device 896.

As can be seen from FIG. 8, according to the embodiment example illustrated here, the heating means 100 may be wound completely around the plastic pipe 760, such that a non-illustrated overlap may occur between the two ends of the heating means 760. The heating means may however not be considered as a (closed) secondary coil, because the ferromagnetic particles that may be embedded in the above-described matrix material may be electrically isolated from each other, and thus a so-called short-circuit current around the whole inner plastic pipe 760 may not be possible.

It is pointed out that the coil device may alternatively also have only one primary coil, which may extend around the bushing 770. Such a single primary coil that may be laid around the bushing 770 may be realized for example with suitable electrical plug connections, which may be opened after a hopefully successful welding process, so that the single primary coil of the arrangement 780 can be removed.

In preferred embodiment examples, the bushing 770 may consist of a material, which would perform a shrinkage along its circumference without a counterpressure by the plastic pipe 760 in a virtual welding process, which shrinkage amounts to at least 10%, preferably at least 20%, and further preferably at least 30%. Thereby, in practice, thus with a counterpressure by the plastic pipe 760, a mechanical tension may be generated, which may result in an improvement of the welding result.

Figure 9:
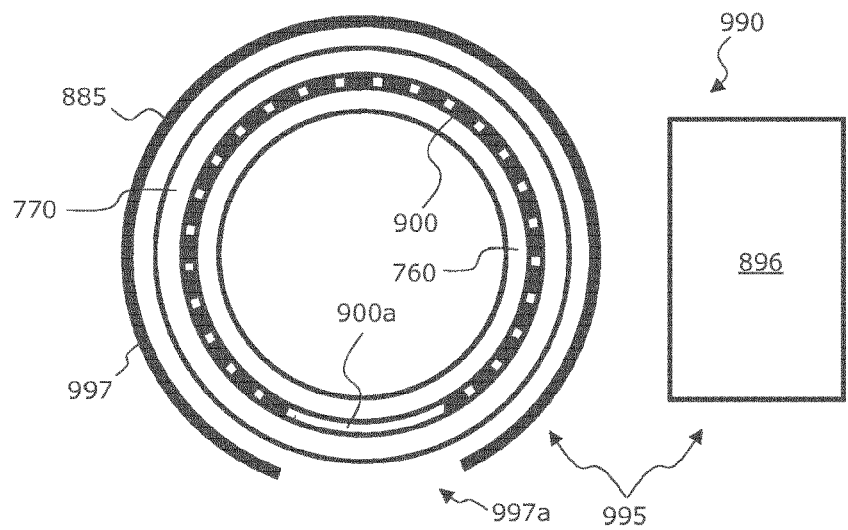
FIG. 9 shows a system having (a) an induction generator having an open coil device, (b) an arrangement to be welded together consisting of one inner plastic pipe and one outer bushing, and (b) a both materially and electrically interrupted heating means between the inner pipe and the outer bushing.

FIG. 9 shows a system 990 having (a) an induction generator 995 having an open coil device 997, (b) an arrangement to be welded together and consisting of an inner plastic pipe 760 and an outer bushing 770, and (b) a heating means 900 between the inner pipe 760 and the outer bushing 770, which heating means may be interrupted both materially and electrically.

The heating means 900 according to embodiment example illustrated here may have an electrically conductive and in particular ferromagnetic material. Thus, basically, not only microscopic (eddy) currents but also macroscopic currents may form in the heating means 900.

It can be seen from FIG. 9, that the heating means 900 may surround the plastic pipe 760 only partially, and thus may form a both materially open and electrically interrupted structure along the circumference of the plastic pipe 760. The open region is indicated in FIG. 9 by the reference numeral 900a. The interruption of the open coil device 997 is provided with the reference numeral 997a. As has been described already above, for the open loop given by the heating means 900, an inductive energy transfer can only be ensured by the generation of eddy currents, which may require a microscopic conductivity of the ribbon-type structure of the heating means 900. A short-circuit current around the whole inner plastic pipe 760 cannot form as a result of the open region 900a.

FIG. 10 shows an open coil device 1097 having intertwined windings. The coil device 1097 may be laid around the arrangement consisting of at least two objects to be welded together without a slipping over (or sheathing) in an easily handable manner. Stated demonstratively, the coil device 1097 may be laid around an outer bushing and/or an outer plastic object like a flexible and elongated inductive cooker plate.

FIG. 11 shows, in a top view, a heating means 1100 having serrated ends 1115. The heating means 1100 may have a ribbon-type structure 1102 consisting of a ferromagnetic material 1140. Also, the heating means 1100 may have a plurality of openings 110.

The heating means 1100 according to the embodiment example illustrated here may be used as a materially open and/or interrupted heating means. During an application, the material interruption may be located between the two ends 1115.

FIG. 12 shows, in a cross-sectional view, a heating means 1200, which may have a ribbon-type structure 1102 that is located on a ribbon-type carrier 1248. The ribbon-type structure 1102 may have a continuous ferromagnetic material 1140. The ribbon-type carrier 1248 may consist of an electrically non-conductive carrier material.

The ribbon-type carrier 1248 may be significantly longer in comparison to the ribbon-type structure 1102. This may have the advantage, that the heating means 1200 can materially be so long that it can be wound completely around a first inner object for an inductive welding process, wherein by an according short embodiment of the electrically conductive ribbon-type structure 1102 it may be ensured that the heating means 1200 does not represent a closed secondary coil having the above-described disadvantages of the development of short-circuit currents.

FIG. 13 shows, in a side view, a heating means 1300, which may have a ribbon-type structure 1302, which may be composed of plural (here three) layers each made of a different ferromagnetic material. A first layer may have a first ferromagnetic material 1140 having a first Curie temperature. A second layer may have a second ferromagnetic material 1342 having a second Curie temperature. A third layer may have a third ferromagnetic material 1344 having a third Curie temperature. According to the embodiment example illustrated here, the three Curie temperatures may be different. Thus, an average Curie temperature of the heating means 1300 may result, which may be adjusted to the respective specific welding application by a suitable selection of the three ferromagnetic materials.

In another embodiment, no common average Curie temperature may arise (or materialize), such that, after a reaching of the lower Curie temperature, an inductive energy input to the heating means 1300 may be reduced, but not prevented completely. As a consequence, a slower temperature increase may result for a same inductive excitation, wherein with the reaching of the respective next higher Curie temperature an inductive coupling between an excitation coil and the heating means 1300 may be reduced.

In a preferred embodiment, a thickness D of the heating means 1300 may be in a range between 0.1 mm and 5 mm, and in particular in a range between 0.5 mm and 3 mm. These dimensions (or sizes) may hold also for a ribbon-type structure, which may consist of only one layer of a ferromagnetic material.

It is pointed out that layered heating means may also have 2, 4 or more layers.

It is further pointed out that the heating means 1300 may have a surface roughness at its plane (or two-dimensional) sides, i.e. in FIG. 13 at the upper surface and/or at the lower surface. Such a surface roughness may be based on elevations and recesses, which may have an average height difference relative to each other. In preferred embodiments, this average height difference may be greater than 10 μm. A surface roughness may lead to improved welding results also for the other heating means described in this document.

FIG. 14 shows an arrangement 1485 to be welded together and having an inner plastic pipe 1460 and an outer bushing 1470, in each of which a materially closed but electrically interrupted heating means 1400 may be integrated. Thereby, the handling and/or the performing of an inductive welding process may be simplified, because only the objects to be welded together, and not in addition a still further (external) heating means must be handled by an operator.

It should be noted that the expression "having" (or "comprising") does not exclude other elements, and that the article "a" (or "an") does not exclude a plurality. Also, elements which are described in connection with different embodiment examples, may be combined.

REFERENCE NUMERALS 100 heating means
102 ribbon-type structure
110 openings
L length
B width
200 heating means
220 particles/ferrites
222 matrix material
300 heating means
324 carrier elements/carrier films
D thickness
400 heating means
422 adhesive force changing layer/adhesive force strengthening layer
424 adhesive force changing layer/adhesive force reducing layer
500 heating means
530 rounding-off
R rounding-off radius
600 heating means
600a surface normal
610 inclined opening
610a longitudinal axis
700 heating means
750 further ribbon-type structure
752 further ribbon-type structure
754 further ribbon-type structure
760 first inner object/plastic pipe
770 second outer object/bushing
780 third inner object/further plastic pipe
785 arrangement
800 system
895 generator/induction generator
896 excitation device
897 coil device
897a excitation coil
900 heating means
900a interruption of heating means/open region
990 system
995 generator/induction generator
997 coil device
997a interruption
1097 coil device having intertwined windings
1100 heating means
1102 ribbon-type structure
1115 serrated ends
1140 ferromagnetic material
1200 heating means
1248 ribbon-type carrier
1300 heating means
1302 ribbon-type structure 1342 ferromagnetic material
1344 ferromagnetic material
1400 heating means (integrated)
1460 first inner object/plastic pipe
1470 second outer object/bushing
1485 arrangement

The invention claimed is:

1. A heating means for thermally connecting two objects each having a plastic material, wherein, during the connecting, (i) a first inner object is surrounded at least partially by a second outer object, and (ii) the heating means surrounds the first inner object at least partially along a complete circumferential course around the first inner object, and is located between the first inner object and the second outer object, the heating means comprising:
   a ribbon-type structure materially interrupted along the circumferential course, wherein the ribbon-type structure has an auxiliary heating material, which is inductively heatable,
   wherein the auxiliary heating material is spatially distributed or arranged along the circumferential course such that an electrical conductivity is interrupted at at least one position along the complete circumferential course around the first inner object,
   wherein the heating means has a ribbon-type carrier, at which the ribbon-type structure is attached, wherein the ribbon-type carrier has a greater dimension than the ribbon-type structure along a longitudinal direction of the ribbon-type structure and wherein the ribbon-type carrier consists of an electrically non-conductive carrier material.

2. The heating means according to claim 1, wherein the auxiliary heating material is a magnetic material.

3. The heating means according to claim 2, wherein the magnetic material is a ferromagnetic or ferrimagnetic material, which has a Curie temperature that is lower than 460° C.

4. The heating means according to claim 1, wherein the auxiliary heating material is an electrically conductive material.

5. The heating means according to claim 1, wherein the ribbon-type structure has an electrically non-conductive matrix material and a plurality of magnetic and/or electrically conductive particles, which are embedded in the matrix material and which are electrically isolated from each other,
   wherein the particles have ferrites, and/or
   wherein the matrix material has a specific electric resistance of at least 1 Ohm/mm$^2$, and/or
   wherein the matrix material has at least one of the following materials:
   (a) thermoplastic polymers;
   (b) polystyrols and their co-polymers;
   (c) elastomers;
   (d) polyesters;
   (e) halogen polymers;
   (f) polyamides, as well as, respectively, co-polymers and/or mixtures thereof.

6. The heating means according to claim 1, wherein the ribbon-type structure further has two plane carrier elements, wherein the auxiliary heating material is embedded between the two carrier elements.

7. The heating means according to claim 1, wherein a plurality of openings is formed in the ribbon-type structure,
   wherein the openings are dimensioned such that molten-on plastic material of the first inner object and/or of the second outer object intrude and connect to the molten-on plastic material of the respective other object, and/or
   wherein the openings are filled with a plastic material, which connects to the molten-on plastic material of the first inner object and/or of the second outer object.

8. The heating means according to claim 1, wherein any one of the following a) through f) is implemented:
   a) at least one end of the ribbon-type structure has a corrugated, serrated and/or meandering contour,
   b) the ribbon-type structure has a structure in layers of different materials, which have a different hardness, a different elasticity and/or a different ductility,
   c) the heating means further has an adhesive force changing layer, which is attached or formed on at least one surface of the ribbon-type structure,
   the ribbon-type structure comprises a plurality of openings with respective sidewalls, wherein the adhesive force changing layer has an adhesive force strengthening layer at the surface of the ribbon-type structure and/or an adhesive force reducing layer at the respective sidewalls of the openings,
   d) the ribbon-type structure comprises a plurality of openings where the openings have an average distance s from each other, which distance satisfies at least one of the following equations in relation to a thickness d of the ribbon-type structure: $0.5<s/d<2$; $0.7<s/d<1.5$; $0.8<s/d<1.3$; $0.9<s/d<1.1$,
   e) the ribbon-type structure comprises a plurality of openings and a transition between a plane surface of the ribbon-type structure and at least some of the openings is rounded-off,
   f) the ribbon-type structure comprises a plurality of openings and at least some of the openings each have a longitudinal axis, which form an angle that is different from zero with a surface normal of the surface of the ribbon-type structure.

9. The heating means according to claim 1, wherein the ribbon-type structure has a surface having elevations and recesses, wherein an average height difference between the elevations and the recesses is in a range between 0.01 mm and 2 mm.

10. The heating means according to claim 1, further comprising:
    at least one further ribbon-type structure, which is arranged beside the ribbon-type structure, wherein the further ribbon-type structure is oriented at least approximately parallel to the ribbon-type structure.

11. An arrangement, comprising:
    a first inner object, which has a first plastic material;
    a second outer object, which surrounds the first inner object at least partially, and which has a second plastic material; and
    a heating means including a ribbon-type structure materially interrupted along a circumferential course,
    wherein the ribbon-type structure has an auxiliary heating material, which is inductively heatable,
    wherein the auxiliary heating material is spatially distributed or arranged along the circumferential course such that an electrical conductivity is interrupted at at least one position along a complete circumferential course around the first inner object,
    which heating means surrounds the first inner object at least partially along the complete circumferential course around the first inner object, and is arranged between the first inner object and the second outer object,
    wherein the heating means has a ribbon-type carrier, at which the ribbon-type structure is attached, wherein the ribbon-type carrier has a greater dimension than the ribbon-type structure along a longitudinal direction of the ribbon-type structure and wherein the ribbon-type carrier consists of an electrically non-conductive carrier material.

12. The arrangement according to claim 11, wherein the heating means is integrated in the first inner object and/or in the second outer object.

13. The arrangement according to claim 11, further comprising:
a third inner object, which has a third plastic material, wherein the second outer object also surrounds the third inner object at least partially, and wherein the heating means is located between the third inner object and the second outer object,
wherein the first inner object is a plastic pipe,
the third inner object is a further plastic pipe, and
the second outer object is a plastic bushing, which surrounds two mutually facing ends, one end of the plastic pipe and one further end of the further plastic pipe.

14. A system, comprising:
a generator for generating an electromagnetic field, which inductively couples a coil device of the generator to a heating means,
wherein the heating means is configured for thermally connecting two objects each having a plastic material, wherein, during the connecting, (i) a first inner object is surrounded at least partially by a second outer object, and (ii) the heating means surrounds the first inner object at least partially along a complete circumferential course around the first inner object, and is located between the first inner object and the second outer object, and wherein the heating means comprises
a ribbon-type structure, which is materially interrupted along a circumferential course, wherein the ribbon-type structure has an auxiliary heating material, which is inductively heatable,
wherein the auxiliary heating material is spatially distributed or arranged along the circumferential course such that an electrical conductivity is interrupted at at least one position along the complete circumferential course around the first inner object,
wherein the heating means has a ribbon-type carrier, at which the ribbon-type structure is attached, wherein the ribbon-type carrier has a greater dimension than the ribbon-type structure along a longitudinal direction of the ribbon-type structure and wherein the ribbon-type carrier consists of an electrically non-conductive carrier material.

15. The system according to claim 14, wherein the coil device is an open coil device with respect to an arrangement which comprises
a first inner object, which has a first plastic material;
a second outer object, which surrounds the first inner object at least partially, and which has a second plastic material; and
a heating means including a ribbon-type structure, which is materially interrupted along the circumferential course,
wherein the ribbon-type structure has an auxiliary heating material, which is inductively heatable,
wherein the auxiliary heating material is spatially distributed or arranged along a circumferential course such that an electrical conductivity is interrupted at at least one position along a complete circumferential course around the first inner object,
which heating means surrounds the first inner object at least partially along a complete circumferential course around the first inner object, and is arranged between the first inner object and the second outer object,
wherein the heating means has a ribbon-type carrier, at which the ribbon-type structure is attached, wherein the ribbon-type carrier has a greater dimension than the ribbon-type structure along a longitudinal direction of the ribbon-type structure and wherein the ribbon-type carrier consists of an electrically non-conductive carrier material.

16. The system according to claim 14, wherein the coil device has a coil having turns that are intertwined in each other and are non-circular.

17. The system according to claim 14, wherein the coil device has a plurality of individual coils.

18. A method for thermally connecting two objects each having a plastic material, the method comprising:
spatially arranging a first inner object, a second outer object, and a heating means including a ribbon-type structure,
wherein the ribbon-type structure is materially interrupted along a circumferential course and has an auxiliary heating material, which is inductively heatable,
wherein the auxiliary heating material is spatially distributed or arranged along the circumferential course such that an electrical conductivity is interrupted at at least one position along a complete circumferential course around the first inner object,
such that (i) the first inner object is surrounded at least partially by the second outer object, and (ii) the heating means surrounds the first inner object at least partially along a completely circumferential course around the first inner object, and is located between the first inner object and the second outer object;
inductively heating the heating means such that molten-on plastic material of the first inner object and/or of the second outer object connects directly or indirectly to molten-on plastic material of the respective other object, and
cooling down the heating means,
wherein the heating means has a ribbon-type carrier, at which the ribbon-type structure is attached, wherein the ribbon-type carrier has a greater dimension than the ribbon-type structure along a longitudinal direction of the ribbon-type structure and wherein the ribbon-type carrier consists of an electrically non-conductive carrier material.

19. The method according to claim 18, wherein the inductive heating includes
exciting a coil device of an induction generator for generating electromagnetic waves, which couple inductively to the heating means, wherein the electromagnetic waves have a frequency, which is greater than 8 kHz.

* * * * *